United States Patent [19]

Briggs, Jr. et al.

[11] 4,182,644

[45] * Jan. 8, 1980

[54] POLYMER IN MONOMER ADHESIVE COMPOSITION AND METHOD EMPLOYING SAME

[75] Inventors: Paul C. Briggs, Jr., Wilmington; Lawrence C. Muschiatti, Newark, both of Del.

[73] Assignee: E. I. Du Pont de Nemours and Company, Wilmington, Del.

[*] Notice: The portion of the term of this patent subsequent to Jun. 17, 1992, has been disclaimed.

[21] Appl. No.: 940,618

[22] Filed: Sep. 8, 1978

Related U.S. Application Data

[63] Continuation of Ser. No. 562,936, Mar. 27, 1975, abandoned, which is a continuation-in-part of Ser. No. 476,537, Jun. 5, 1974, abandoned.

[51] Int. Cl.$^2$ .................. B32B 7/00; C08L 61/20

[52] U.S. Cl. ................... 156/310; 156/315; 156/332; 156/331; 156/333; 260/31.2 R; 525/189

[58] Field of Search ............... 156/310, 332, 315, 333, 156/331, 334; 260/31.2 R, 31.2 XA, 851, 884, 875, 885

[56] References Cited

U.S. PATENT DOCUMENTS

| | | | |
|---|---|---|---|
| 2,921,045 | 1/1960 | Di Martino | 260/885 |
| 3,616,040 | 10/1971 | Toback | 156/310 |

FOREIGN PATENT DOCUMENTS 1077083  7/1967  United Kingdom ............... 156/332

*Primary Examiner*—William A. Powell
*Assistant Examiner*—J. J. Gallagher

[57] ABSTRACT

Adhesive compositions comprising a solution of polymer dissolved in acrylic monomers containing an organic sulfonyl chloride, a polymerization catalyst and an accelerator.

7 Claims, No Drawings

POLYMER IN MONOMER ADHESIVE COMPOSITION AND METHOD EMPLOYING SAME

This is a continuation of application Ser. No. 562,936, filed Mar. 27, 1975, now abandoned, which is in turn a continuation-in-part of application Ser. No. 476,537, filed June 5, 1974, now abandoned.

BACKGROUND OF THE INVENTION

U.S. Pat. application Ser. No. 357,387, filed May 4, 1973, discloses adhesive compositions containing chlorosulfonated polyethylene dissolved in vinyl monomer, and adhesive compositions containing chlorinated polyethylene and a sulfonyl chloride dissolved in vinyl monomer. These adhesive compositions yield relatively rapid bonds of high strength.

SUMMARY OF THIS INVENTION

The present invention relates to an adhesive composition comprising a polymer-in-monomer solution, an organic sulfonyl chloride having up to 20 carbon atoms and/or chlorosulfonated polymer, a polymerization catalyst and an accelerator. The polymer of the polymer-in-monomer solution (as distinguished from any chlorosulfonated polymer) is present in the amount of 10 to 75 percent by weight of the solution. The adhesive has a viscosity of between about 2000 centipoise and about 1,000,000 centipoise. The monomers employed in the adhesive are acrylic or methacrylic. The organic sulfonyl chloride is present in an amount such that about 3 to 160 mmoles of sulfonyl chloride groups are present per 100 grams of polymer. The polymerization catalyst is present in the amount of up to about 15% by weight of the solution, i.e., polymer, monomer, and organic sulfonyl chloride, and usually in the amount of about 0.2 to 5% by weight of the solution. Preferred polymerization catalysts are free radical generators such as organic peroxides, organic hydroperoxides and organic peresters. The accelerator should be present in the amount of between about 0.01 and 10% by weight of the solution, usually about 0.1 to 5% by weight of the solution.

DETAILED DESCRIPTION OF THIS INVENTION

The term "polymer(s)" as used herein means, the polymer(s) dissolved or to be dissolved in acrylic or methacrylic monomer, but does not include chlorosulfonated polymer(s). Polymers suitable for use in making the polymer-in-monomer solutions used in this invention should have molecular weights in the range of about ten thousand to one million or more. The polymers must be at least partly soluble in the acrylic monomers. Suitable polymers include: fluoroelastomers such as vinylidene fluoride/hexafluoropropene polymer, vinylidene fluoride/hexafluoropropene/tetrafluoroethylene polymer; chlorinated polyethylene, chloroprene polymers such as polychloroprene, methyl methacrylate/chloroprene polymer; polyester polymers such as bisphenol A/fumaric acid polyester, terephthalatemaleic acid based polyesters; vinyl chloride polymers such as vinyl chloride/vinyl acetate copolymer; acrylate polymers such as polyethyl acrylate, styrene/butyl acrylate polymer, ethyl acrylate/methyl methacrylate polymer, ethylene/methyl acrylate polymer, n-butyl methacrylate/isobutyl methacrylate polymer; hydrocarbon polymers such as polyisoprene, polystyrene, pale crepe natural rubber, styrene/butadiene rubber; polyalkylene ethers such as polyepichlorohydrin; vinyl acetate polymers such as ethylene/vinyl acetate polymer; polyurethane polymers such as polytetramethylene ether glycol/2,4-toluene diisocyanate polyurethane, polytetramethylene ether glycol/trimethylolpropane diallyl ether/2,4 and 2,6-toluene diisocyanate polyurethane; and acrylonitrile copolymers such as butadiene/acrylonitrile polymers.

Mixtures of these polymers may also be employed. The preferred polymers are those which are elastomeric at the use temperature, since the adhesive formed using such a polymer is less brittle.

The acrylic or methacrylic monomers that act as solvents for the polymers and are to be polymerized when the composition is used as an adhesive include the following: methyl methacrylate, ethyl methacrylate, methyl acrylate, ethyl acrylate, butyl methacrylate, cyclohexyl methacrylate, hexyl methacrylate, 2-ethylhexyl methacrylate, lauryl methacrylate, butyl acrylate, cyclohexyl acrylate, hexyl acrylate, 2-ethylhexyl acrylate, lauryl acrylate, methacrylic acid, acrylic acid, ethylene glycol and higher-glycol acrylates and diacrylates and methacrylates and dimethacrylates. The preferred monomers are lower alkyl acrylates and methacrylates and ethylene glycol and butylene glycol dimethacrylate.

The sulfonyl chloride contained in the polymer-in-monomer solution can be any one of or a mixture of organic sulfonyl chlorides selected from the class consisting of sulfonyl chlorides having up to 20 carbon atoms and chlorosulfonated polymers which are soluble in the acrylic monomers. The preferred chlorosulfonated polymer is chlorosulfonated polyethylene. Satisfactory sulfonyl chlorides of up to 20 carbon atoms have the formula $R(SO_2Cl)_x$ where x is 1 to 5 and R is $C_1$ to $C_{20}$ alkyl or $C_6$–$C_{20}$ aryl; R may also contain oxygen or nitrogen atoms. Specific sulfonyl chloride compounds which are useful include:

$$CH_3SO_2Cl$$
$$ClCH_2CH_2CH_2SO_2Cl$$
$$CH_3(CH_2)_3SO_2Cl$$
$$CH_3(CH_2)_{11}SO_2Cl$$
$$CH_3(CH_2)_{12}SO_2Cl$$
$$CH_3(CH_2)_{15}SO_2Cl$$

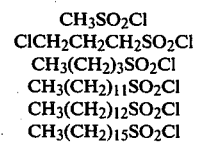

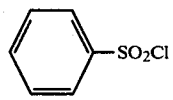

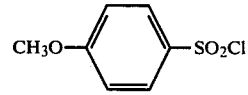

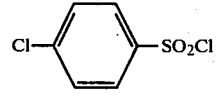

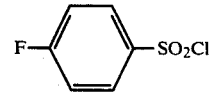

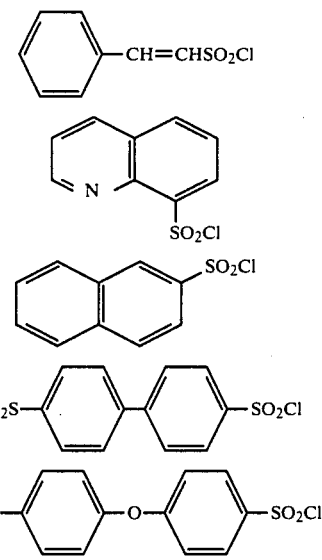

Chlorosulfonated polyethylene suitable in the process of the present invention can be prepared by reaction of linear or branched polyethylene and sulfuryl chloride, or sulfur dioxide and chlorine. Suitable polyethylenes have melt index of 0.1 to 500 g./10 min. as measured by ASTM-D-1238-52T. Chlorosulfonated polyethylene is available commercially. The chlorosulfonated polyethylene may also be a chlorosulfonated copolymer of ethylene with small proportions of propylene or other olefins. Various chlorosulfonated polyethylenes and methods of their preparation are discussed in U.S. Pat. No. 2,982,759. A suitable chlorosulfonated polyethylene should contain about 25–70 weight percent chlorine and about 0.1 to 8 weight percent sulfur.

In general any chlorosulfonated polymer which is soluble in the acrylic or methacrylate monomers may be used as the sulfonyl chloride source. Examples are α-olefin copolymers with monomers such as styrene, butadiene, vinyl acetate, acrylic acid, methacrylic acid, methyl methacrylate, and acrylonitrile. Such soluble chlorosulfonated polymers will normally contain about 0.1 to 8 weight percent sulfur and about 25 to 70 weight percent chlorine. The molecular weight of these chlorosulfonated polymers is not critical. Chlorosulfonated polymers having molecular weights of the same order of magnitude as hydrocarbon waxes are satisfactory, and chlorosulfonated polymers having much higher molecular weights are also satisfactory. Illustrative of the above types of polymers are ethylene/methacrylic acid copolymer containing 10 weight percent methacrylic acid. Before chlorosulfonation the copolymer had a melt index of 95 g./10 min. The polymer was chlorosulfonated to the extent that it contained 1.05 weight percent sulfur and 40.5% chlorine. Another ethylene/methacrylic acid copolymer having a melt index of 500 g./10 min. was chlorosulfonated to the extent that it contained 1.1 weight percent sulfur and 41 weight percent chlorine. The Brookfield viscosity of the solution containing the polymer-in-monomer solution and the organic sulfonyl chloride should be within the range of 2,000 centipoise and 1,000,000 centipoise, as measured by the ASTM V 490.0500 using a number 4 spindle at 12 and 6 rpm. The amount of polymer dissolved in the acrylic or methacrylic monomer will be within the range of 10 to 75 percent by weight of the solution—preferably the amount of polymer employed is about 15 to 50 percent by weight of the solution.

The amount of organic sulfonyl chloride employed in the polymer-in-monomer solution is such that the concentration of sulfonyl chloride groups, i.e. SO$_2$Cl, is within the range of 3 to 160 m moles per 100 grams of polymer, preferably 20 to 100 m moles per 100 g of polymer. The function of the sulfonyl chloride is not entirely understood, but it interacts with the polymerization catalyst or catalysts at the time the adhesive bond is to be formed to speed and strengthen the ultimate bond.

The adhesive composition requires the presence of a catalyst of the free radical type. Suitable catalysts include the organic peroxides, organic hydroperoxides and organic peresters. Specific catalysts that may be employed are benzoyl peroxide, cumene hydroperoxide, acetyl peroxide, tertiary butyl hydroperoxide, lauroyl peroxide, methyl ethyl ketone peroxide. The amount of the catalyst needed to polymerize the adhesive quickly will vary with the particular material selected, but the catalyst will normally be present in the amount of up to about 15% by weight of the adhesive mixture. It is usually preferred to have the catalyst present in the amount of about 0.2 to 5% by weight of the mixture; however, in some cases the amount of polymerization catalyst can be less than 0.2% by weight. In fact, if very little or no inhibitor, antioxidant or other inhibiting additive is present in the mixture, the peroxide spontaneously formed by the exposure of acrylic monomers to air is sufficient to cause the mixture to polymerize in the presence of an accelerator and form satisfactory adhesive bonds. Example 22 below includes such an embodiment.

The adhesive composition must also contain an effective amount of an accelerator. The exact amount necessary to effectively polymerize the adhesive mixture will depend on the concentration of the other ingredients, but generally the amount will be within the range of about 0.1 to 5% by weight of the adhesive composition. Accelerators found effective in the adhesive compositions of this invention include the aldehyde-amine condensation products such as, for example, the condensation product of butyraldehyde and a primary amine such as aniline or butylamine. Various companies market accelerators of this type.

Other materials can also be added to the adhesive compositions to effect the speed of reaction, for example, it is well known that inhibitors such as hydroquinone will reduce the rate of polymerization if this is desired. Various metal salts such as organic salts of transition metals, for example cobalt, nickel, manganese, or iron naphthenate, copper octoate, iron hexoate and iron propionate can be added to further increase the speed of reaction.

The adhesive composition may be formulated by mixing the polymer-in-monomer solution containing the sulfonyl chloride with the polymerization catalyst and the accelerator, and then applying the mixture to the substrates to be bonded together, or the accelerator may be applied to the substrate and the polymer-in-monomer solution containing the sulfonyl chloride and peroxide then applied. Because polymerization usually proceeds rapidly when all the components are mixed together it is often desirable to apply the accelerator to one substrate and the remainder of the components to the other substrate, the adhesive composition being formed when the two substrates to be bonded are brought together sufficiently close that the gap between them is filled with the applied materials.

The adhesive compositions made from the polymer-in-monomer solutions cure at room temperature, in the presence or absence of air. The adhesive composition can be used to bond porous surfaces or smooth surfaces. The compositions can be used to bond oily metal, as well as etched aluminum, copper, brass, polymeric materials having polar groups such as polyesters, polyamides, polyvinyl chloride, glass, wood, paper and painted surfaces.

In the following examples which illustrate the invention all parts and percentages are in parts by weight unless otherwise specified.

EXAMPLES

EXAMPLE 1

A polymer solution was prepared by addition of 200 g of a commercially available polyethyl acrylate elastomer (20 weight percent) to a mixture of acrylate monomers comprising 690 g methyl methacrylate (69 weight percent) (containing 50–90 ppm hydroquinone inhibitor), 100 g glacial methacrylic acid (10 weight percent) (containing 250 ppm of 4-methoxyphenol), and 10 g ethylene glycol dimethylacrylate (1 weight percent). The mixture was rolled in a jar at room temperature until solution of the polymer was complete (48–64 hours). The solution has a Brookfield viscosity using a number 4 spindle and 12 rpm of 31,250 centipoise.

The polymer employed contained greater than 95% by weight polymerized ethyl acrylate units and a small amount of polymerized units of another vinyl monomer. The other vinyl monomer contained some chlorine atoms. This polymer has an unmilled cement viscosity when 20 weight percent is dissolved in methyl ethyl ketone of 25,000 centipoise. The Mooney viscosity ML-4 (212° F.) of the polymer is 45–65.

To a portion of the solution was added 0.5 parts per hundred (based on total solution) cumene hydroperoxide and 82 millimoles methane sulfonyl chloride per 100 g of polymer.

Lap shear specimens were prepared by applying to 1"×3"×0.062" grit blasted and perchloroethylene degreased steel strips a commercially available accelerator which was a mixture of butyraldehyde and n-butylamine condensation products (sold as Du Pont "Accelerator" 833). The accelerator was applied with a cotton swab and then wiped to a thin film with a piece of tissue paper. A small amount of the adhesive composition was applied and pressed between the steel coupons in a mold so that a glueline of 0.007–0.010"×1"×1" or 0.007–0.010"×0.5"×1" was obtained. The specimens were tested in shear 15 minutes (1" overlap) and 24 hours (0.5" overlap) after assembly in an Instron apparatus with separation rates of 0.5 inches/minute (ASTM D-1876-61T) and 0.05 inches/minute, respectively. Lap shear strengths were recorded as the average of four specimens and are listed as follows:

| Bond Age | Lap Shear Strength |
| --- | --- |
| 15 min. | 200 psi |
| 24 hrs. | 2500 |

EXAMPLES 2–8

Polymer solutions were prepared as in Example 1 by dissolving the amounts of polymer shown in the following Table in a mixture of acrylate monomers. In addition to the polymer the solutions contained 10 weight percent glacial methacrylic acid, 1 weight percent ethylene glycol dimethacrylate, and the remainder was methyl methacrylate. To a portion of each polymer solution was added 0.5 pph cumene hydroperoxide (based on total solution) and the indicated number of millimoles of methane sulfonyl chloride/100 g polymer.

Lap shear specimens were prepared as described in Example 1 with a 0.5" overlap of the 1" wide metal coupons. Lap shear strengths were recorded as the average of four specimens after 24 hours and are listed below.

| Example | Polymer | mmoles Methane Sulfonyl Chloride/ 100 g Polymer | 24 Hr. Lap Shear | Brookfield Viscosity of the Solution: #4 Spindle, 12 rpm (in centipoise) |
| --- | --- | --- | --- | --- |
| 2 | 45 wt.% of a commercially available fluoroelastomer containing 60 wt.% vinylidene fluoride units and 40 wt.% hexafluoropropylene units and having an average Mooney viscosity of 35. | 25.2 | 3820 psi | 29,300 |
| 3 | 20 Wt.% of a commercially available fast crystallizing adhesive grade polychloroprene having a Mooney viscosity of 81–95. | 80.4 | 1420 | 22,450 |
| 4 | 20 wt.% of the polymer of Ex. 3 and 3 wt.% of a commercially available bisphenol A epoxy resin. | 80.4 | 2790 | 38,000 |
| 5 | 25 wt.% of commercially available fast crystallizing, medium viscosity polychloroprene having a Mooney viscosity of 45–54 and 3 wt.% of the bisphenol A epoxy resin of Ex. 4 | 59.1 | 3340 | 32,500 |
| 6 | 15 wt.% of a commercially available diisocyanate-polyalkylene ether glycol elastomer having an average Mooney viscosity of 60. | 116.0 | 2070 | 16,100 |
| 7 | 30 wt.% methyl methacrylate-chloroprene alternating copolymer having a glass transition temperature of −25° C. Polymer prepared at 40° C. | 48.0 | 3080 | 100,000 (Estimated) |

| Example | Polymer | mmoles Methane Sulfonyl Chloride/ 100 g Polymer | 24 Hr. Lap Shear | Brookfield Viscosity of the Solution: #4 Spindle, 12 rpm (in centipoise) |
|---|---|---|---|---|
| 8 | None | 20.2[1] | 90[2] | Estimated less than 5 |

[1] Mmoles methane sulfonyl chloride/100 g acrylate monomers.
[2] Lap shear specimens clipped with two 3/4" paper clips. Bond thickness 0.001–0.002".

EXAMPLES 9–15

Polymer solutions were prepared by the method of Example 1 except where as shown below the ethylene glycol dimethacrylate was not always included and acrylate monomer concentrations varied. The adhesive compositions are listed below (in wt. %).

| Example | 9 | 10 | 11 | 12 | 13 | 14 | 15 |
|---|---|---|---|---|---|---|---|
| Bisphenol A/Fumaric Acid Polyester* | 53.7 | — | — | — | — | — | — |
| Styrene/Butyl Acrylate Copolymer | — | 50 | — | — | — | — | — |
| Vinyl Chloride(83%)/Vinyl Acetate(16%)/Dibasic Acid (1%) Polymer having a Brookfield Viscosity of 20 centipoise measured at a concentration of 20% by wt. in methyl ethyl ketone. | — | — | 32 | — | — | — | — |
| Ethyl acrylate(13%)/Methyl Methacrylate(87%) Copolymers having an inherent viscosity of 0.45 measured in chloroform at 25° C. | — | — | — | 35 | — | — | — |
| The Chloroprene polymer of Ex. 5. | — | — | — | — | 25 | — | — |
| Polystyrene** | — | — | — | — | — | 30 | — |
| The chloroprene polymer of Ex. 3 | — | — | — | — | — | — | 20 |
| The bisphenol resin of Ex. 4 | — | — | — | — | 3 | — | 3 |
| Methyl methacrylate | 40.5 | 42.5 | 60.5 | 54 | 61 | 59 | 66 |
| Methacrylic Acid | 5.8 | 7.5 | 7.5 | 10 | 10 | 10 | 10 |
| Ethylene Glycol Dimethacrylate | — | — | 1 | 1 | 1 | 1 | — |

*Polymer had a Brookfield viscosity in a 50:50 weight mixture in styrene at 25° C. of 475 centipoise.
**A commercially available crystalline polystyrene having a melt flow of 1.7–11.2 at 190° C.

Adhesive solutions were prepared by addition to a portion of each polymer solution either 1.0 or 0.5 pph (based on total solution) cumene hydroperoxide and the indicated number of millimoles of either methane sulfonyl or diphenyl ether-4,4'-disulfonyl chloride/100 g polymer.

Lap shear specimens were prepared by applying a thin film of butyraldehyde-amine condensation product to the metal strips. The adhesive solution was applied between the strips which were then held firmly together by means of two 1" paper clips so as to give a 1" overlap. A bond thickness of 0.001–0.003" resulted. Lap shear strengths were recorded between 2 and 30 minutes after assembly with an Instron. Two and three minute bonds were set up and clipped together directly in the Instron. Ten, fifteen, and thirty minute bonds were clipped together outside the Instron. Examples 9–11 used as the accelerator a commercially available condensation product of butyraldehyde and aniline (sold as Du Pont "Accelerator" 808) as primer while Examples 12–15 used the same accelerator as Example 1. Rapid adhesive development is illustrated by the lap shear strengths listed below.

| Example | Cumene Hydroperoxide | mmole Sulfonyl Chloride/100 g Polymer | Bond Age (min) | Lap Shear | Brookfield of the Solution: #4 Spindle, 12 rpm (in centipoise) |
|---|---|---|---|---|---|
| 9 | 1.0 pph | 16.3 Diphenylether-4,4'-disulfonyl chloride | 2 | 1225 psi | 840* |
| 10 | 1.0 | 17.1 Diphenylether-4,4'-disulfonyl chloride | 2 | 650 | 28900 |
| 11 | 1.0 | 26.8 Diphenylether-4,4'-disulfonyl chloride | 3 | 720 | 15250 |
| 12 | 0.5 | 38.1 Methane sulfonyl chloride | 10 | 2600 | 2420** |
| 13 | 0.5 | 59.2 Methane sulfonyl chloride | 15 | 510 | 32500 |
| 14 | 0.5 | 48.0 Methane sulfonyl chloride | 30 | 1470 | 5000 |
| 15 | 0.5 | 80.4 Methane sulfonyl chloride | 30 | 840 | 22450 |

*#2 Spindle
**#3 Spindle

EXAMPLES 16–20

Adhesive solutions were prepared by addition of 0.5 pph cumene hydroperoxide and 80.4 mmoles of various monomeric sulfonyl chlorides per 100 g of polymer to the polymer solution of Example 1.

Lap shear specimens were prepared as described in Example 1 with a 0.5" overlap of the 1" wide metal strips, except that Du Pont "Accelerator" 808 was used with all samples. Lap shear strengths were recorded 24 or 48 hours after assembly as the average of four specimens.

| Example | mmoles Sulfonyl Chloride/100 g Polymer | Bond Age (hr) | Lap Shear |
|---|---|---|---|
| 16 | 80.4 Tridecane Sulfonyl Chloride | 24 | 3120 psi |

-continued

| Example | mmoles Sulfonyl Chloride/ 100 g Polymer | Bond Age (hr) | Lap Shear |
|---|---|---|---|
| 17 | 80.4 Methane Sulfonyl Chloride | 48 | 3410 |
| 18 | 80.4 Butane Sulfonyl Chloride | 24 | 3710 |
| 19 | 80.4 2-Naphthalene Sulfonyl Chloride | 48 | 890 |
| 20 | 80.4 p-Toluene Sulfonyl Chloride | 24 | 2540 |

These examples illustrate some of the various sulfonyl chlorides that may be used in this invention.

EXAMPLE 21

A polymer solution containing 30 weight percent of a commercially available styrene butadiene block copolymer having a viscosity in toluene at 23° C. of 19 centipoise at a concentration of 5%, 75 centipoise at a concentration of 10%, 300 centipoise at a concentration of 15%, 1050 centipoise at a concentration of 20%, and 4485 centipoise at a concentration of 25% by weight; 62.5 weight percent methyl methacrylate; and 7.5 weight percent methacrylic acid was prepared by the method of Example 1. The solution has a Brookfield viscosity of 63,500 using a #4 spindle at 6 rpm.

Brookfield viscosity of 1180 using a #3 spindle and 12 rpm.

The following table shows the results obtained when the above polymer solution was used either alone or with various concentrations of cumene hydroperoxide (parts per hundred parts of total solution) and/or methane sulfonyl chloride (mmoles/100 g of polymer). The following table also shows the results obtained when the polymer solution of Example 1 was tested, and when the polymer solution of Example 5 was tested.

Lap shear specimens were prepared and tested according to the procedures for Example 1, except that in the case of 35 weight percent n-butyl methacrylate/isobutyl methacrylate copolymer adhesive the metal coupons were clipped together outside the Instron, as in Examples 12–15, giving a glueline of 0.001–0.003 inch.

The table shows the lap shear strengths when measured at five to thirty minutes and 24 hours after assembly.

The Table illustrates both the enhancement in ultimate lap shear strength and in bond development rate upon addition of methane sulfonyl chloride to cumene hydroperoxide containing adhesives.

| Example | Polymer | Cumene Hydroperoxide (Parts Per Hundred) | Mmoles Methane Sulfonyl Chloride/100 g Polymer | Lap Shear Minutes | Lap Shear 24 hours |
|---|---|---|---|---|---|
| 22 | 35 wt.% n-butyl methacrylate/isobutyl methacrylate copolymer | 0 | 0 | 10/7 psi | 260 psi |
| | | 0.5 | 0 | 10/11 | 630 |
| | | 0 | 38.2 | 10/97 | 1810 |
| | | 0.5 | 38.2 | 5/215 | 3590 |
| 23 | 20 wt.% polyethyl acrylate of Example 1 | 0 | 0 | 30/0 | Not Tested |
| | | 0.5 | 0 | 30/128 | Not Tested |
| | | 0 | 82.0 | 30/0 | Not Tested |
| | | 0.5 | 82.0 | 15/200 | 2500 |
| 24 | 25 wt.% polychloroprene plus bisphenol A epoxy resin of Example 5 | 0 | 0 | 30/0 | 76 |
| | | 0.5 | 0 | 30/1230 | 1030 |
| | | 0 | 58.7 | 30/0 | 0 |
| | | 0.5 | 58.7 | 30/1250 | 3340 |

Adhesive solutions were prepared by addition of 1.0 pph cumene hydroperoxide and various amounts of p-toluene sulfonyl chloride to portions of the polymer solution.

Lap shear specimens were prepared according to the method of Example 1. "Accelerator" 808 was used to prime metal coupons which were then assembled with a 1″ overlap. Lap shear strengths were recorded after 15 minutes.

| mmoles p-Toluene Sulfonyl Chloride/100 g Polymer | 15 Minute Lap Shear Strength |
|---|---|
| 0 | 50 psi |
| 2.4 | 250 |
| 23.8 | 320 |
| 119.0 | 120 |
| 286.0 | 0 |

This example illustrates the existence of an optimum sulfonyl chloride concentration for adhesive development of each polymer adhesive.

EXAMPLES 22–24

A solution of 35 weight percent n-butyl methacrylate (50%)/isobutyl methacrylate (50%) copolymer was prepared by the procedure of Examples 2–8. The polymer had an inherent viscosity of 0.61 when measured in chloroform at 25° C. The polymer solution had a

EXAMPLE 25

An adhesive was prepared by adding 0.5 pph cumene hydroperoxide and 61.5 mmoles methane sulfonyl chloride/100 g of polymer to a polymer solution composed of 19.5 weight percent of a very fast crystallizing adhesive grade polychloroprene (Mooney viscosity of 75–90 at 212° F.), 2.8 weight percent of a bisphenol A epoxy resin described in Example 4, 67.3 weight percent n-butyl methacrylate, 9.5 weight percent methacrylic acid, and 0.9 weight percent ethylene glycol dimethacrylate. The polymer solution had a Brookfield viscosity of 23,800 measured with a #4 spindle at 12 rpm.

Lap shear specimens were prepared according to the method of Example 1.

| Bond Age | Lap Shear Strength |
|---|---|
| 60 min. | 885 psi |
| 24 hrs. | 1600 |

EXAMPLE 26

A solution of 5 wt. % chlorosulfonated polyethylene, 20 wt. % polychloroprene (sold as Neoprene W by Du Pont), 64 wt. % methyl methacrylate, 10 wt. % methacrylic acid, and 1 wt. % ethylene glycol dimethacrylate was prepared by the method of Example 1. The chlorosulfonated polyethylene, prepared from branched polyethylene of melt index 100, contained 43 wt. % chlorine and 1.1 wt. % sulfur and had a Mooney viscosity of 30. The solution contained 8.5 mmoles sulfonyl chloride groups per 100 gm polychloroprene. The solution had a Brookfield viscosity of 14,000 cps (#4 spindle, 12 rpm). An adhesive was prepared by the addition of 0.5 pph cumene hydroperoxide to the solution. Lap shear specimens were prepared according to the procedure of Example 1, except that the accelerator used was the butyraldehyde-aniline condensation product set forth in Examples 9–11.

| Bond Age | Lap Shear Strength |
|---|---|
| 72 hours | 3210 psi |

EXAMPLE 27

To a solution containing (1) 25 wt. % polychloroprene (sold as Neoprene W), (2) 61 wt. % methyl methacrylate, (3) 10 wt. % methacrylic acid, (4) 3 wt. % of a commercially available bisphenol A epoxy resin, and (5) 1 wt. % ethylene dimethacrylate, was added 56 mmoles of methane sulfonyl chloride per 100 grams of polychloroprene in the solution, and 0.5 part of cumene hydroperoxide per 100 parts of the solution.

The above mixture was employed to bond together 2 different sets (2 strips to a set) of cold rolled steel strips. One set of strips was coated with Du Pont Accelerator 808, so that both surfaces to be bonded had a coating about 0.0001–0.0002 inch thick. The other set of strips was not coated.

The solution was then applied to both sets of strips and the surfaces of each set brought together so that the bond line was about 0.002–0.004 inch thick. The solution filled the gap between the surfaces. The set of strips that was not treated with the accelerator had a fixture time (i.e., time from assembly until strips could be handled without specimen coming apart) of greater than thirty minutes, and an ultimate strength at 20 hours of 1770 psi, while the set of strips that was treated with accelerator had a fixture time of 11.5 to 12 minutes and an ultimate strength at 20 hours of 2330 psi.

We claim:

1. A process for bonding two surfaces together which comprises applying to at least one of the surfaces an amine aldehyde polymerization accelerator, and then applying a composition containing (a) at least one polymer dissolved in (b) at least one polymerizable monomer selected from the class consisting of acrylic and methacrylic monomers, (c) an organic sulfonyl chloride selected from the class consisting of organic sulfonyl chlorides having up to 20 carbon atoms and chlorosulfonated polymers, and (d) an organic hydroperoxide free radical polymerization catalyst to at least one surface, and then bringing the surfaces sufficiently close together that the accelerator and the composition containing the dissolved polymer fill the gap between the surfaces.

2. An adhesive composition comprising (a) at least one polymer dissolved in (b) at least one polymerizable monomer selected from the class consisting of acrylic and methacrylic monomers (c) an organic sulfonyl chloride selected from the class consisting of organic sulfonyl chlorides having up to 20 carbon atoms and chlorosulfonated polymers, (d) an organic hydroperoxide free radical polymerization catalyst and (e) an aldehyde-amine condensation product accelerator, the organic sulfonyl chloride being present in the composition in the amount such that about 3 to 160 mmoles of sulfonyl chloride groups are present per 100 grams of polymer, the polymer being present in the solution in the amount of 10 to 75 percent by weight of the solution, the adhesive having a Brookfield viscosity in the range of 2,000 centipoise to 1,000,000 centipoise.

3. The adhesive composition of claim 1 in which the free radical catalyst is present to the extent of up to about 15% by weight of the adhesive, and the accelerator is present to the extent of about 0.01 to about 10% by weight of the adhesive.

4. The adhesive composition of claim 3 in which the free radical catalyst is cumene hydroperoxide and the accelerator is an amine-aldehyde condensation product.

5. The adhesive composition of claim 4 in which the organic sulfonyl chloride has the formula $R(SO_2Cl)_x$ where X is 1 to 5 and R is $C_1$ to $C_{20}$ alkyl or $C_6$ to $C_{20}$ aryl.

6. The composition of claim 1 in which the polymer is selected from the class consisting of fluoroelastomeric polymers, acrylate polymers, chlorinated polyethylene, chloroprene polymers, polyester polymers, polyurethane polymers, hydrocarbon polymers, acrylonitrile copolymers, polyalkylene ether polymers, vinyl chloride polymers and vinyl acetate polymers.

7. The composition of claim 1 in which the free radical catalyst is present in the amount of 0.2 to 5% by weight of the solution.

* * * * *

UNITED STATES PATENT OFFICE
CERTIFICATE OF CORRECTION

PATENT NO. : 4,182,644

DATED : January 8, 1980

INVENTOR(S) : Paul C. Briggs, Jr.
Lawrence C. Muschiatti

It is certified that error appears in the above-identified patent and that said Letters Patent are hereby corrected as shown below:

Column 1, lines 66-7; Chart at Column 9, line 28; Column 9, line 64; and Column 10, lines 48-9, "n-butyl", each occurrence, should read --n-butyl--.

Column 5, line 26, "dimethylacrylate" should read --dimethacrylate--.

Column 6, lines 6-7, "n-butylamine" should read --n-butylamine--.

Chart at Column 7, line 61, "1" under Example 11 should read -- -- --, and the blank under Example 15 should read --1--.

Chart at Column 9, line 9; and Chart at Column 9, line 51, "p-Toluene", each occurrence should read --p-Toluene--.

UNITED STATES PATENT OFFICE
CERTIFICATE OF CORRECTION

PATENT NO. : 4,182,644
DATED : January 8, 1980
INVENTOR(S) : Paul C. Briggs, Jr.
Lawrence C. Muschiatti It is certified that error appears in the above-identified patent and that said Letters Patent are hereby corrected as shown below:

Column 9, line 43, "p-toluene" should read --p-toluene--.

Chart at Column 10, line 37, "30/1230" should read --30/230--.

Signed and Sealed this

Fifth Day of August 1980

[SEAL]

Attest:

SIDNEY A. DIAMOND

Attesting Officer

Commissioner of Patents and Trademarks